(12) United States Patent
Gowda et al.

(10) Patent No.: US 10,997,245 B2
(45) Date of Patent: May 4, 2021

(54) DYNAMIC GRAPH EXTRACTION BASED ON DISTRIBUTED HUB AND SPOKE BIG DATA ANALYTICS

(71) Applicant: Intel Corporation, Santa Clara, CA (US)

(72) Inventors: Bhaskar Gowda, Hillsboro, OR (US); Addicam Sanjay, Gilbert, AZ (US); Prathibha Dattakumar, Austin, TX (US); Joe Jensen, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 441 days.

(21) Appl. No.: 15/754,947

(22) PCT Filed: Sep. 26, 2015

(86) PCT No.: PCT/US2015/052526
§ 371 (c)(1),
(2) Date: Feb. 23, 2018

(87) PCT Pub. No.: WO2017/052666
PCT Pub. Date: Mar. 30, 2017

(65) Prior Publication Data
US 2020/0242164 A1 Jul. 30, 2020

(51) Int. Cl.
*G06F 16/901* (2019.01)
*G06N 5/00* (2006.01)
*G06F 5/00* (2006.01)

(52) U.S. Cl.
CPC ......... *G06F 16/9024* (2019.01); *G06N 5/003* (2013.01)

(58) Field of Classification Search
CPC ............... G06F 16/9024; G06F 21/554; G06F 11/3438; G06F 11/00; H04L 63/14
See application file for complete search history.

(56) References Cited

U.S. PATENT DOCUMENTS

2007/0209074 A1* 9/2007 Coffman ............... H04L 63/145
726/23
2007/0209075 A1 9/2007 Coffman
2010/0318491 A1 12/2010 Anderson et al.
(Continued)

FOREIGN PATENT DOCUMENTS

CA 2933426 A1 * 12/2016 ............. G06N 20/00
EP 2221719 A1 8/2010
EP 2680210 A1 1/2014

OTHER PUBLICATIONS

International Search Report and Written Opinion dated Jun. 30, 2016 for International Application No. PCT/US2015/052526, 11 pages.
(Continued)

*Primary Examiner* — Cheyne D Ly
(74) *Attorney, Agent, or Firm* — Schwabe, Williamson & Wyatt, P.C.

(57) ABSTRACT

Methods and systems to represent activities of multiple devices in a graph, search the graph with progressively fewer restrictions based on activities of a first device to select a subgraph as a suggestion/prediction model for the first device, on a distributed storage/processor system, and to search the model at the first device based on 5 recent activities of the first device to generate a suggested/predicted activity for the first device.

20 Claims, 9 Drawing Sheets

(56) References Cited

U.S. PATENT DOCUMENTS

| | | |
|---|---|---|
| 2013/0036129 A1 | 2/2013 | Havel et al. |
| 2013/0073509 A1 | 3/2013 | Burkard et al. |
| 2015/0261399 A1 | 9/2015 | Puzis |
| 2016/0189072 A1* | 6/2016 | Kuroki ............... G06Q 30/0283 705/7.24 |
| 2016/0373476 A1* | 12/2016 | Dell'Anno ............ G06F 21/554 |
| 2017/0013003 A1* | 1/2017 | Samuni ................... G06F 11/00 |

OTHER PUBLICATIONS

Extended European Search Report dated May 27, 2019 for European Patent Application No. 15904999.8, 9 pages.

Mikhail Bilenko et al., "Mining the Search Trails of Surfing Crowds: Identifying Relevant Websites From User Activity", Apr. 21-25, 2008, 10 pages, Beijing, China.

Office Action dated Mar. 4, 2020 for European Patent Application No. 15904999.8, 7 pages.

* cited by examiner

DYNAMIC GRAPH EXTRACTION BASED ON DISTRIBUTED HUB AND SPOKE BIG DATA ANALYTICS

CROSS REFERENCE TO RELATED APPLICATIONS

The present application is a national phase entry under 35 U.S.C. § 371 of International Application No. PCT/US2015/052526, filed Sep. 26, 2015, entitled "DYNAMIC GRAPH EXTRACTION BASED ON DISTRIBUTED HUB AND SPOKE BIG DATA ANALYTICS", which designated, among the various States, the United States of America. The disclosure of International Application No. PCT/US2015/052526 is hereby incorporated by reference in its entirety.

BACKGROUND

A graph is data structure to represent "things" as nodes/vertices, and to represent relationships amongst the things as edges between the respective vertices.

BRIEF DESCRIPTION OF THE DRAWINGS

For illustrative purposes, one or more features disclosed herein may be presented and/or described by way of example and/or with reference to one or more drawing figured listed below. Methods and systems disclosed herein are not, however, limited to such examples or illustrations.

Figure 1:
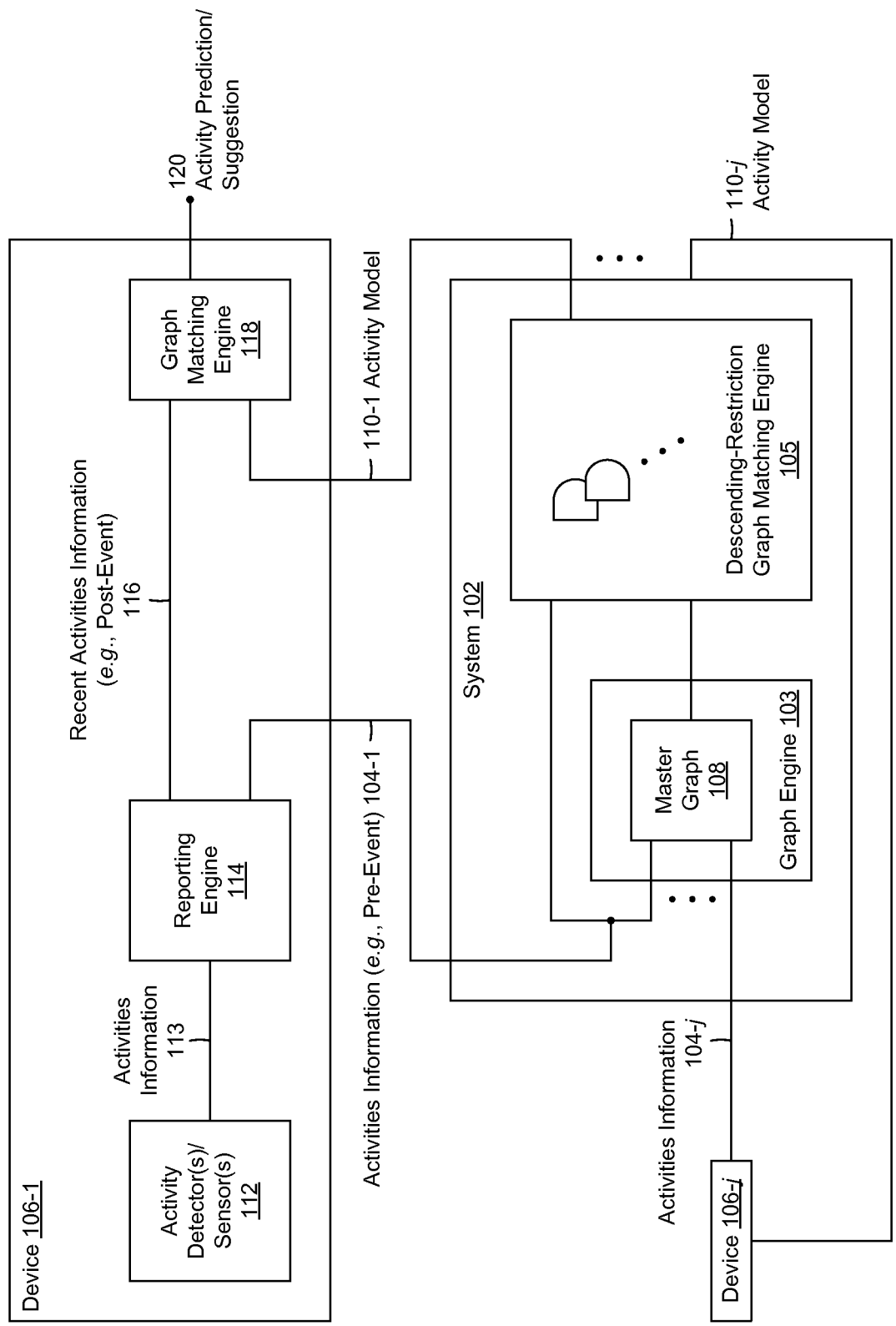
FIG. 1 is a block diagram of a system to represent activities of multiple devices in a graph, search the graph with progressively fewer restrictions based on activities of a first device to select a subgraph as a suggestion/prediction model for the first device, on a distributed storage/processor system, and a device to search the model based on recent activities of the device to generate a suggested/predicted activity for the device.

In the drawings, the leftmost digit(s) of a reference number identifies the drawing in which the reference number first appears.

DETAILED DESCRIPTION

FIG. 1 is a block diagram of a system 102 represent activities of multiple devices 106 in a master graph, search the master graph with progressively fewer restrictions until a portion of the master graph is identified that corresponds to a sequence of activities of a first one of the devices, and output a subgraph of the master graph that includes the identified portion of the subgraph as an activity prediction/suggestion model of the first device.

System 102 includes a graph engine 103 to represent activity information 104 of multiple devices 106 in a master graph 108, in which vertices represent activities of the respective devices 106, and edges represent sequences of the activities.

Master graph 108 may include multiple types of vertices and/or edges, such that multiple types of relationships may exist between vertices. Such a graph is referred to herein as a property graph. Master graph 108 is not, however, limited to property graphs.

System 102 further includes a descending-restriction graph matching engine 105 to search master graph 108 with progressively fewer restrictions (i.e., at progressively expansive levels of restriction), until a portion of master graph 108 is identified that corresponds to a sequence of activities indicated within activities information 104-1 of device 106-1, and output a subgraph of master graph 108 that includes the identified portion of master graph 108 as an activity prediction and/or suggestion model (model) 110-1 of device 106-1.

Graph matching engine 105 may be configured to identify the portion of master graph 108 as a sequence of vertices of master graph 108 that matches the sequence of activities indicated within activities information 104-1, at the respective level of restriction.

Activities information 104 may be in the form of a graph and/or graph data, in which vertices represent activities of the respective devices 106, and edges represent sequences of the activities.

One or more of devices 106 may include, without limitation, a wireless smart device (e.g., a mobile telephone, smart watch, and/or tablet/pad type computing device), a television set-top device, a mobile (e.g., vehicle) tracking device, a reader-based tracking device (e.g., radio frequency identification tag (RFID) device(s)), and/or a near-field communication (NFC) device.

Activities information 104 may relate to activities performed by a user of a device 106, and/or activities performed, detected, sensed, and/or observed by and/or at a device 106. Examples include, without limitation, physical activities, actions, and/or motions of a user, device 106, and/or a device sensed and/or controlled by device 106 (e.g., movement/location of RFID tags and/or motion/direction of an imaging device), location information, environmental information, user input to device 106-1 through a human interface device (e.g., cursor/finger motions, keyboard/data field entries), and/or information presented to a user at device 106-1.

In FIG. 1, device 106-1 includes an activity monitor to monitor, detect, and/or sense activities, and a reporting engine 114 to report activities information 104-1 to system 108.

Reporting engine 114 may be configured to maintain a running history of activities as they occur, and to output the history as activity information 104-1 upon an event. The event may include, without limitation, a pre-determined time, an event-triggered time, and/or a conclusion of a window of time, which may be pre-defined or event-triggered. Reporting engine 114 may be configured to output activity information 104-1 on a periodic basis (e.g., every twenty-four hours), and/or other basis/bases.

Reporting engine 114 may be configured to output recent activities information 116, which may represent activities that occur subsequent to an event for which activities information 1041 is output.

Reporting engine 114 may include a graph engine to record activities information 113 in a graph, and to output activity information 104-1 and/or recent activity information 116 as a graph and/or as graph data.

Device 106-1 further includes a graph matching engine 118 to search activity model 110-1 based on recent activities information 116, and output an activity prediction/suggestion 120 based on results of the search.

Devices 106 may be configured to exchange activities information with one another, and one or more of devices is configured to construct master graph 108, and generate a respective model (e.g., model 110-1). Depending on the number of devices 106 and the nature of activities information 104, however, traversal of master graph 108 may be expensive in terms of storage and/or computational resources. In some situations, a device 106 may lack sufficient storage and/or computational resources to construct a model based on activities of multiple other devices. Offloading activities information from devices 106 to system 102 may be useful to leverage larger-scale storage and/or processing capabilities of a back-end system. In this way, system 102 may be able to maintain and search a relatively large master graph 108, and provide activity models 110 that are smaller (e.g., magnitudes smaller) than master graph 108, and thus more easily searchable by graph matching engines of devices 106.

System 102 may be configured to construct graph 108 and/or traverse graph 108 in accordance with one or more techniques. In an embodiment, graph matching engine 105 may be configured to divide master graph 108 into subgraphs (e.g., based on the least edges disrupted), and apply an approximate subgraph matching (ASM) algorithm to each subgraph to select a subgraph best suited to device 106-6, or a user thereof.

Advancements in distributed storage and distributed processing present opportunities for more efficient and scalable graph processing. ASM algorithms may not be suitable for distributed storage and distributed processing.

In another embodiment, referred to herein as a scale-up approach, graph matching engine 105 is configured to search master graph 108 at progressively expansive levels of restriction until a sequence of vertices of master graph 108 is identified that corresponds to a sequence of activities contained within activities information 104-1 of device 106-1. The scale-up approach may be useful to utilize distributed storage tools and/or distributed processing tools, examples of which are provided further below.

The scale-up approached may be utilized in place of approximate subgraph matching, or may be used in combination with approximate subgraph matching.

The scale-up approach considers exact sequences of activities, at the outset, rather than random activities to find matches. Duration of the activities may also considered in identifying a best matching subgraph. The scale-up approach is thus more than conventional graph matching.

In addition, searching at progressively expansive levels of restriction, in which searching at subsequent levels is halted/bypassed when a match(es) is found at a current level, may reduce runtimes to obtain activity models 110 relative to conventional graph matching techniques.

In addition, flexible scripts may be used to perform the searching.

System 102 and/or device 106-1 may be configured as described in one or more examples below. System 102 and device 106-1 are not, however, limited to examples below.

Figure 2:
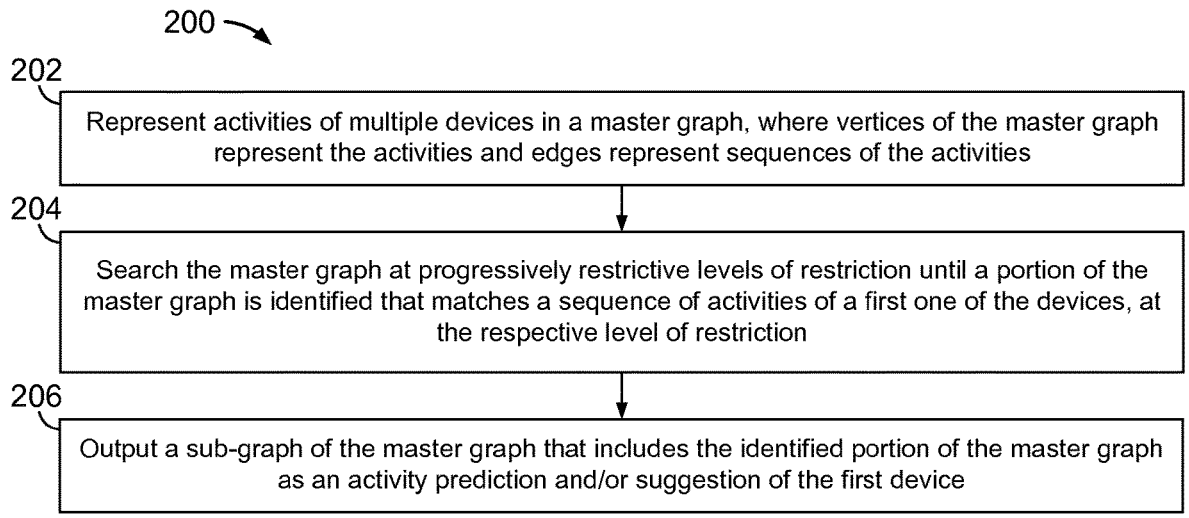
FIG. 2 is a flowchart of a method of constructing or generating an activity prediction and/or suggestion model for a device based on similarities, correlations, and/or relationships amongst activities of the device and activities of other devices.

FIG. 2 is a flowchart of a method 200 of constructing or generating an activity prediction and/or suggestion model for a device, based on similarities, correlations, and/or relationships amongst activities of the device and activities of other devices.

At 202, activities of multiple devices are represented in a master graph, such as described above with respect to master graph 108.

At 204, the master graph is searched at progressively expansive levels of restriction until a portion of the master graph is identified that matches a sequence of activities of a first one of the devices, at the respective level of restriction.

At 206, a subgraph of the master graph that includes the identified portion of the master graph, is output as an activity prediction and/or suggestion model of the first device, such as described above with respect to model 110-1.

In an embodiment, the searching at 204 includes searching the master graph at the progressively expansive levels of restriction until a sequence of vertices along a path of sequential vertices of the master graph is identified that matches a sequence of vertices of activities of the first device, at the respective level of restriction.

Further in this embodiment, the subgraph of the master graph may be selected to include the sequence of vertices, and one or more adjacent vertices. An adjacent vertex may include a subsequent vertex (i.e., a vertex along the path that is subsequent to the sequence of vertices). In this example, the sequence of vertices represents a sequence of activities of one or more of the devices, and the subsequent vertex represents an activity that occurred at one or more of the devices subsequent to the sequence of activities.

In an embodiment, the searching at 204 includes performing a first search to identify a sequence of vertices of the master graph that is identical to a sequence of vertices of the graph data of the first device, and performing a second search to identify a sequence of vertices of the of the master graph that partially matches the sequence of vertices of the graph data of the first device, if no sequence of vertices of the master graph is identified by the first search.

The first search may be performed to identify a sequence of vertices of the master graph for which vertex types and vertex properties are identical to vertex types and vertex properties of the sequence of vertices of the graph data of the first device.

The second search may be performed to identify a sequence of vertices of the master graph for which vertex types and a subset of vertex properties are identical to vertex types and the subset of vertex properties of the sequence of vertices of the graph data of the first device, if no sequence of vertices of the master graph is identified by the first search.

In an embodiment, the second search includes identifying multiple sequences of vertices of the master graph for which vertex types and the subset of vertex properties are identical to vertex types and the subset of vertex properties of the sequence of vertices of the graph data of the first device.

In this embodiment, the multiple sequences of vertices of the master graph may be scored based on other vertex properties of the respective paths, and selecting one or more of the multiple sequences of vertices of the master graph based on the respective scores. For each selected sequences of vertices, a A subgraph of the master graph may be output for each of the one or more selected sequences of vertices, where each subgraph represents a respective activity prediction/suggestion model.

In an embodiment, the master graph and the model are constructed based on pre-event activities, and is used to predict and/or suggest a post-event activity of the first device based on preceding post-event activities of the first device. Examples are provided below with reference to FIGS. 3 and 4.

Figure 3:
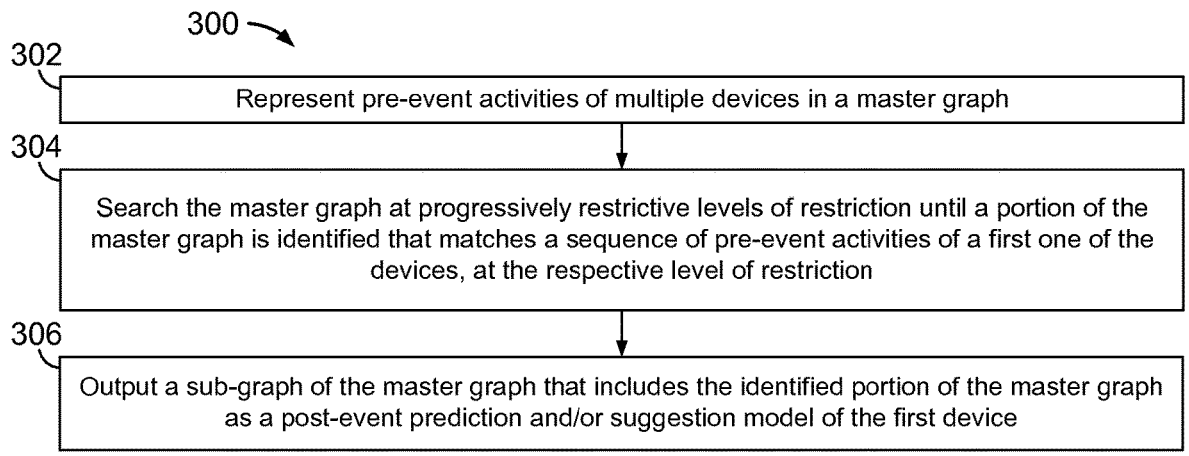
FIG. 3 is a flowchart of a method of constructing or generating an activity prediction and/or suggestion model for a device based on similarities, correlations, and/or relationships amongst pre-event activities of the device and pre-event activities of other devices.

FIG. 3 is a flowchart of a method 300 of constructing or generating an activity prediction and/or suggestion model for a device, based on similarities, correlations, and/or relationships amongst pre-event activities of the device and pre-event activities of other devices.

At 302, pre-event activities of multiple devices are represented in a master graph, such as described in one or more examples above.

At 304, the master graph is searched at progressively expansive levels of restriction until a portion of the master graph is identified that matches a sequence of the pre-event activities of a first one of the devices, at the respective level of restriction.

At 306, a subgraph of the master graph that includes the identified portion of the master graph, is output as a post-event activity prediction and/or suggestion model of the first device.

Figure 4:
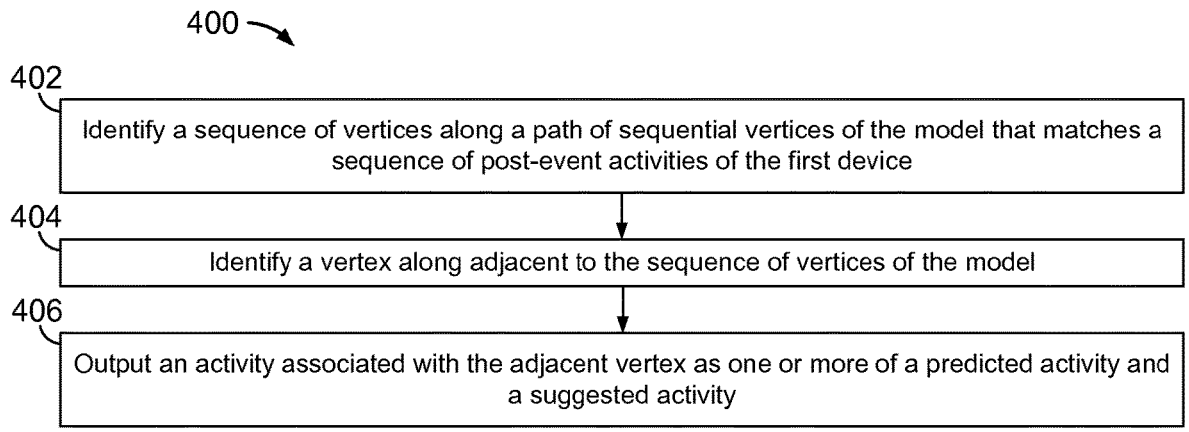
FIG. 4 is a flowchart of a method of predicting and/or suggesting a post-event activity of the device based on preceding post-event activities of the device and a model constructed as in accordance with the method of FIG. 3.

FIG. 4 is a flowchart of a method 400 of predicting and/or suggesting a post-event activity of a device based on preceding post-event activities of the device and a model constructed as described above with respect to FIG. 3.

At 402, the model is searched to identify a sequence of vertices along a path of sequential vertices of the model that matches a sequence of post-event activities of the first device.

At 404, an adjacent vertex of the model (e.g., a subsequent vertex along the path of the model) is identified.

At 406, an activity associated with the adjacent vertex is output as one or more of a predicted activity and a suggested activity.

An example is provided below in which devices 106 in FIG. 1 include mobile user devices (e.g., smart phones and/or computing devices). In this example, system 102 may be configured to construct/generate model 110-1 to identify/suggest products that might be of interest to a user based on browser activities of the user, and browser activities of other users.

In this example, an application may be loaded/installed on each user device to collect information regarding activities of the respective user device (e.g., actions of the respective user).

Figure 5:
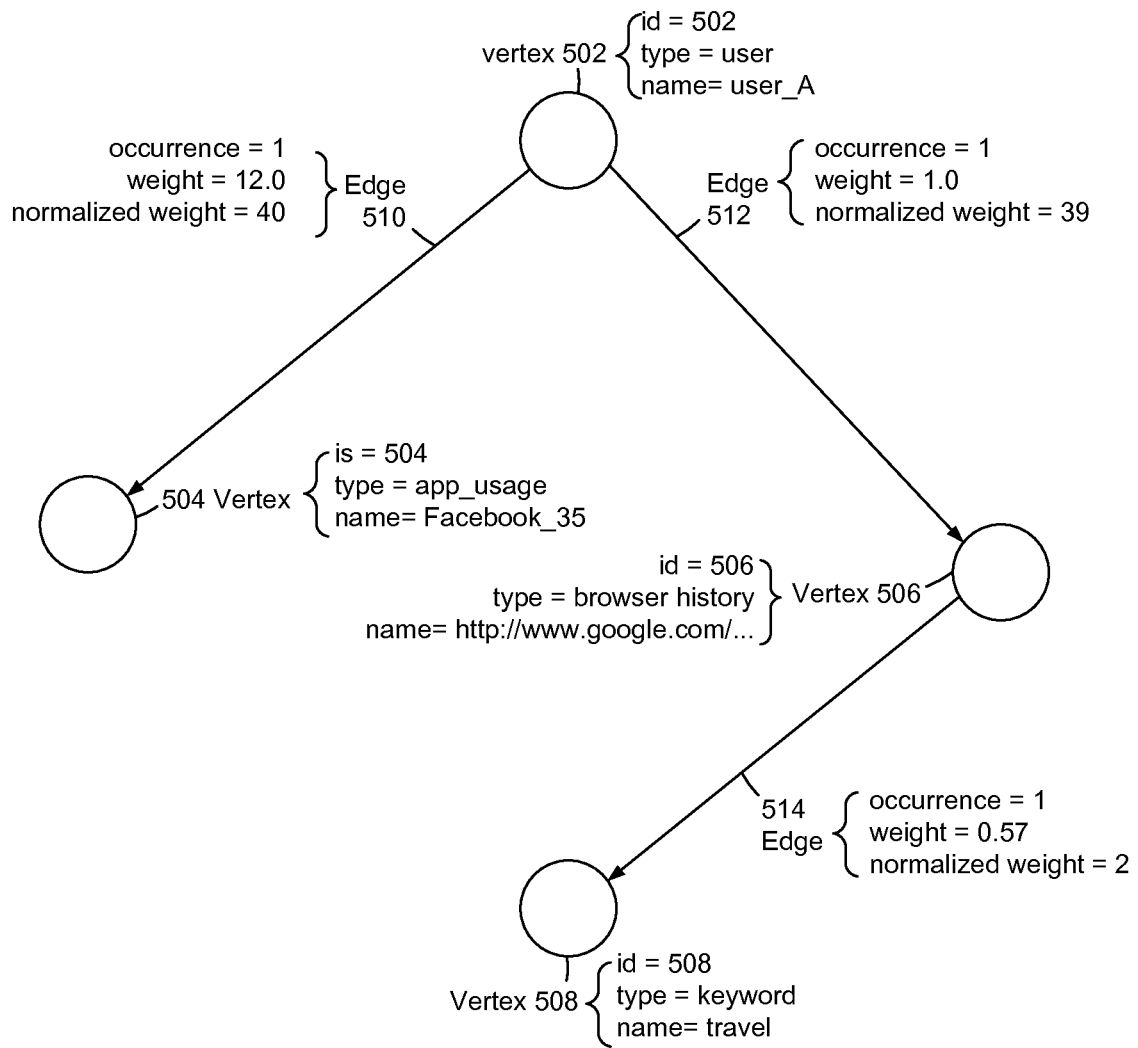
FIG. 5 is a conceptual illustration of a subgraph that includes vertices and edges to represent browser activity of a user device.

FIG. 5 is a conceptual illustration of a subgraph 500 that includes vertices 502-508 and edges 510-514 to represent browser activity of a user device. Each of vertices 502-508 has an associated identifier (ID), type, and name.

In the example of FIG. 5, vertex types include "user" (vertex 502), "app_usage" (vertex 504), "browser_history" (vertex 506), and "keyword" (vertex 508). Methods and systems disclosed herein are not, however, limited to the examples of FIG. 5.

A vertex having type=app_usage, and name=Facebook, may indicate that a user used an application named Facebook.

A vertex name, or name property, may be split into a name prefix and a name suffix. The name may, for example, be split on an underscore "_." Vertex 504, for example, has name=Facebook_35, which may indicate that a user used a Facebook application for 35 minutes.

Vertex type=browser_history may be used to record browsing history of a user. In FIG. 5, vertex 506 records a URL visited by a user as a name, illustrated here as name=http://www.google.com/ . . . .

In an embodiment, a URL is split on back-slashes "/", starting from domain name, and a tokens is generated for text/characters between each pair of back-slashes. The tokens may include a token for a domain name of the URL (e.g., www.google.com). Tokens are discussed further below with reference to FIG. 6.

Each of edges 510-514 has an associated ID and one or more properties, illustrated here as number of occurrences, weight, and normalized weight, such as to normalize weights across all edge weights of a graph.

Figure 6:
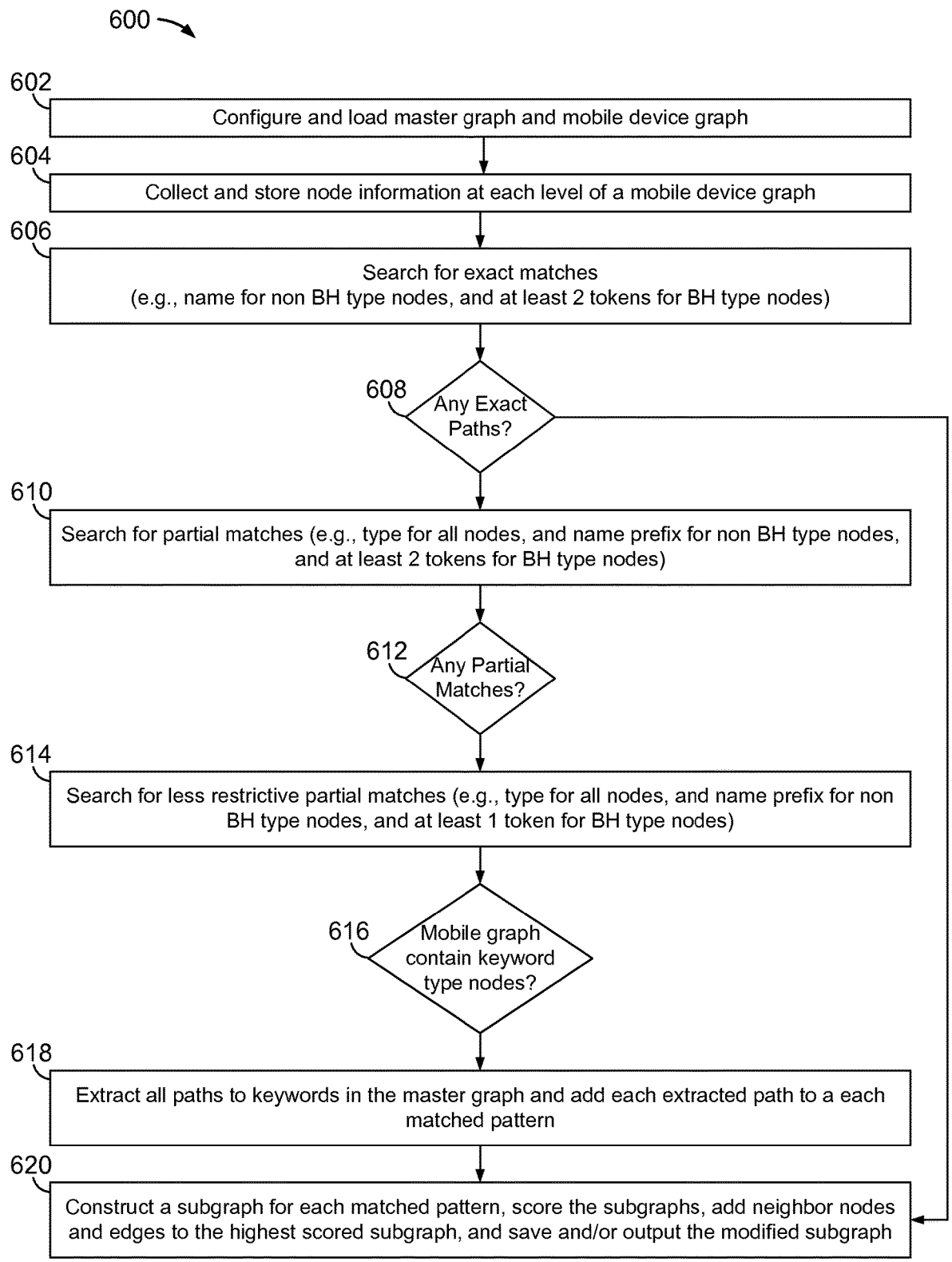
FIG. 6 is a flowchart of a method of searching a master graph of browser activities of multiple users, at progressively expansive levels of restriction.

FIG. 6 is a flowchart of a method 600 of searching a master graph of browser activities of multiple users, at progressively expansive levels of restriction.

At 602, a master graph and a mobile device graph are loaded. The master graph includes historic data. The mobile device graph includes recent activities of a mobile device.

At 604, information in the mobile graph is collected and saved in local data structures for use in finding the best matching pattern in the master graph. The information may include properties of various vertices or nodes.

At 606-614, queries are performed with progressively fewer restrictions to find a pattern that most closely matches the most recent behavioral pattern exhibited by a user of the mobile device.

The first query (606) is most restrictive and tries to find a sequence of actions or vertices that exactly match the ones in the mobile graph. Vertex type and name properties, such as described above with respect to FIG. 5, may be considered for exact matching. Matches may be sought between tokens generated from the mobile graph tokens generated from the master graph. A match of at least two tokens may indicate a matching domain name and one or more other portions of a URL (e.g., keywords used for browsing).

The first query looks for vertices representing past actions for which name properties match exactly (e.g., name=Facebook_35). In other words, the first query looks for a behavioral pattern in which a user used the Facebook application for 35 minutes.

At 608, if an exact match is found, processing proceeds to 620 (i.e., further searching may be halted, omitted, or bypassed).

If no exact match is found, a second query, having less restrictive search criteria, is performed at 610.

The second query (610) may search for vertices for which the user action type (e.g., app_usage), and name prefix (e.g., Facebook) match. In this example, the duration of the action is not considered in the second search. Duration may, however, be considered in the scoring at 620.

For vertex type=browser_history (e.g., vertex 506 in FIG. 5), the second query may require that at least two tokens in the URL match, such as described above with respect to the first query at 606. In an embodiment, a minimum of 2 tokens, one of which includes a domain name, must be matched to consider the actions similar.

At 612, if a partial match is found, processing proceeds to 620 (i.e., further searching may be halted, omitted, or bypassed).

At 614, a third level query is performed. The third level may be the least restrictive.

For vertex type=browser_history, the third level query may require that at least the token that includes the domain name of the URL match.

After the queries are executed and matching patterns are found, the paths are scored at 620. The highest scored pattern is considered the best and closest match for the input mobile graph.

By employing different restrictive levels of queries, with most restrictive search at the outset (606), and skipping execution of lower-level queries when matches are found, the total run time of the script is controlled and shortened. With restrictive queries, the result size, or number of matches, is also controlled and reduced to an extent. Scoring at 620 validates the closest match, such that matches obtained from a higher level query are preferred over matches from a lower level query.

Table 1 below lists example scoring techniques for example vertex types.

TABLE 1

| Vertex Type | Scoring Object |
|---|---|
| Browser History | Split URL on "/", and match tokens starting from domain name. |
| User | Exact name match. Name prefix match. |
| User Action (e.g., application usage) | Exact name match. Name prefix match. Time match (e.g., within a range of +/−15 minutes, closest time match weighs more). |

A model generated based on user activities on mobile user devices may be useful, for example, to suggest and/or predict one or more of a variety of types of user activities, including, without limitation, URLs to visit, vendors/merchandise/products/services, and social relationships/connections.

As described further above, methods and systems disclosed herein may be configured in a distributed storage and/or distributed processing environment, an example of which is described below with respect to FIG. 7. Methods and systems disclosed herein are not, however, limited to the example of FIG. 7.

Figure 7:
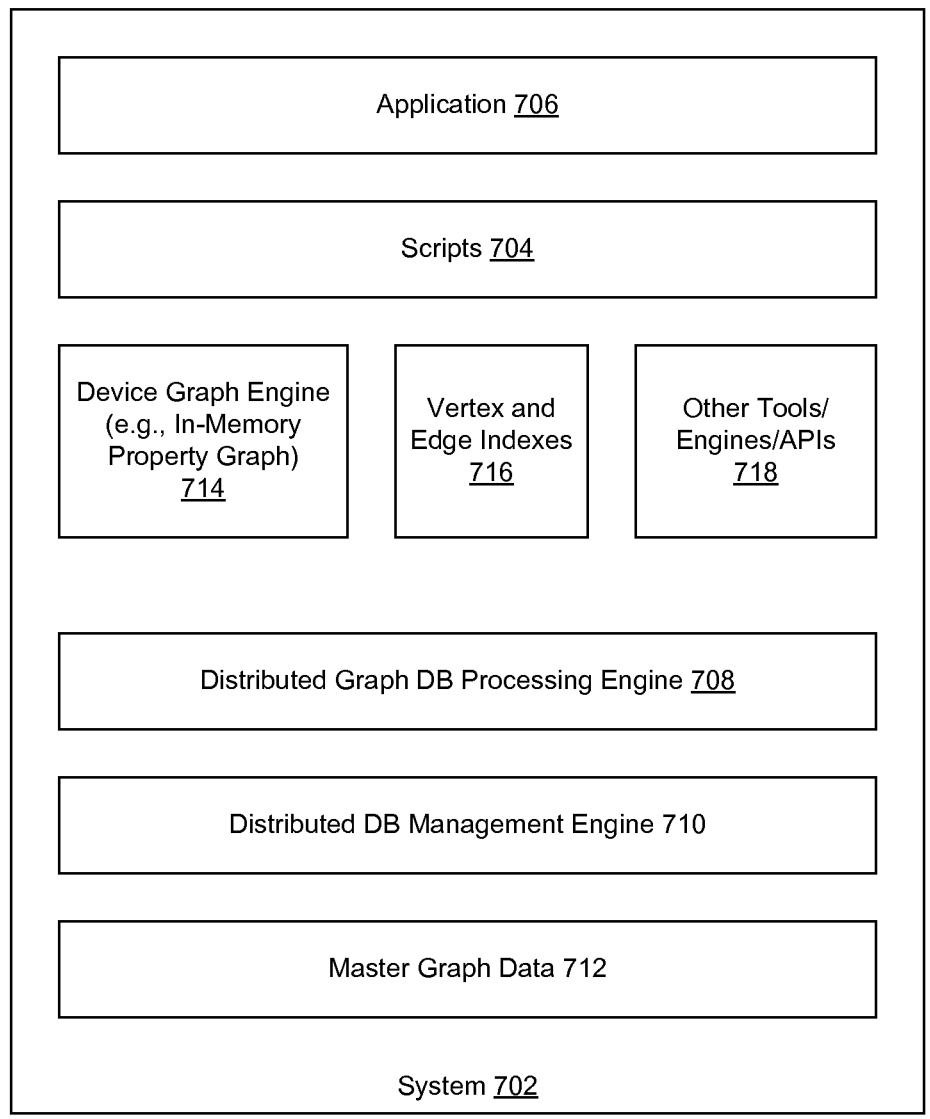
FIG. 7 is a block diagram of a system to select subgraphs of a master graph based on activities of a user/device.

FIG. 7 is a block diagram of a system 702 to select subgraphs of a master graph based on activities of a user/device.

System 702 includes (solution) script 704 (e.g., Gremlin script), to search the master graph at progressively expansive levels of restriction, and an application 706 to call script 704.

System 702 further includes a device graph engine 714 (e.g., an in-memory property graph engine known as Tinker Graph), to load and/or extract data from a device graph (e.g., activity information 104-1).

System 702 further includes vertex and edge indexes 716, such as described above with respect to 604 in FIG. 1.

System 702 may include one or more other tools/engines/APIs 718 (e.g., TinkerPop).

System 702 further includes a scalable distributed graph processing engine 708 (e.g., a scalable, distributed, disk-based graph database known as Titan, or Titan Graph, developed by Aurelius).

System 702 further includes a distributed database management engine 710 (e.g., a distributed DB management system known as Cassandra, or Apache Cassandra), to manage distributed master graph data 712.

System 702, or portions thereof (e.g., graph DB and Cassandra), may be configured/distributed over a multi-node cluster.

Nodes/vertexes may be optimized and indexed to improve query response times. For example, vertex and/or edge indexes may be implemented on the master graph data structure, and may be used to provide faster retrieval of results. The outcome of the solution script is a subgraph extracted from the relatively large backend master graph that best matches an input mobile graph. The input mobile graph represents a user's most recent actions. Behavioral patterns are identified in the input mobile graph and similar patterns are discovered in the large backend master graph. The extracted subgraph may be useful in predicting and/or recommending subsequent actions of the user.

In another example, each device 106 in FIG. 1 may be associated with a respective one or more physical outlets/stores of a company (e.g., a chain of clothing/apparel stores), and may be configured to report activity information regarding merchandise within the respective stores. The activity information may be reported relative to physical layouts of the respective stores. The activity information may include and/or be gleaned from information read/received from, for example, RFID tags attached to the respective merchandise. The activity information may include, without limitation, locations of the respective merchandise with a store, length of time at the respective locations, movements, and/or rearrangements of the merchandise, prices of the merchandise, and/or special offers/incentives associated with the merchandise.

In this example, a prediction/suggestion model may be generated for a first one of the stores based on similarities/relationships/correlations amongst merchandise-related activities of the first store and merchandise-related activities of other stores. Such a model may be useful to suggest, without limitation, locations, arrangements, prices, and/or special offers/discounts/incentives for merchandise of the first store based on similarities/relationships/correlations amongst the model and recent merchandise-related activities of the first store.

Figure 8:
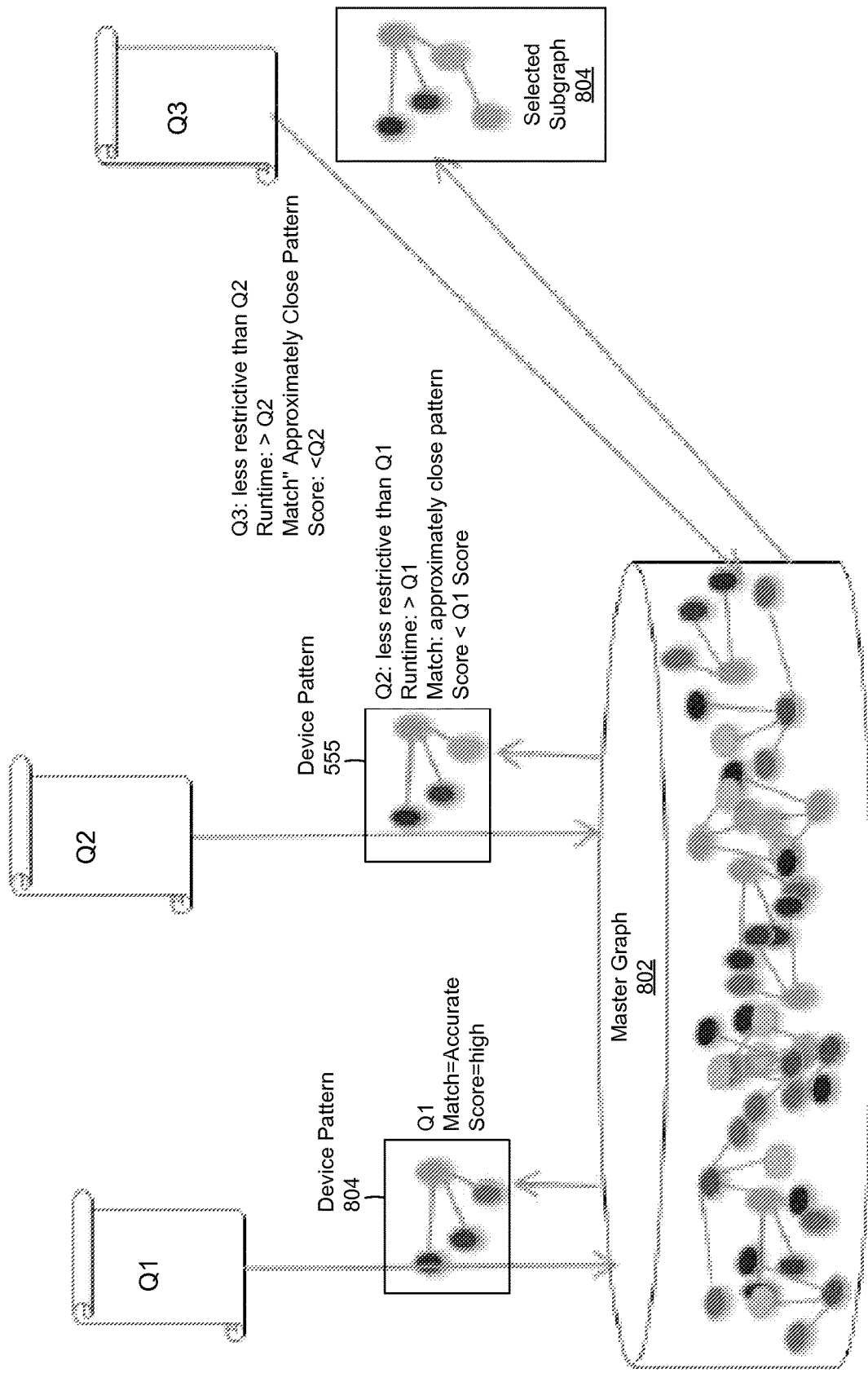
FIG. 8 is a conceptual illustration of searching a master graph at progressively expansive levels of restriction, based on a pattern of a device graph.

FIG. 8 is a conceptual illustration of searching a master graph 802 at progressively expansive levels of restriction, based on a pattern 804 (e.g., a subgraph) of a device graph (e.g., activities information 104-1 in FIG. 1). The example of FIG. 8 includes three levels of search, illustrated here as Q1, Q2, and Q3.

One or more features disclosed herein may be implemented in, without limitation, circuitry, a machine, a computer system, a processor and memory, a computer program encoded within a computer-readable medium, and/or combinations thereof. Circuitry may include discrete and/or integrated circuitry, application specific integrated circuitry (ASIC), a system-on-a-chip (SOC), and combinations thereof.

Information processing by software may be concretely realized by using hardware resources.

Figure 9:
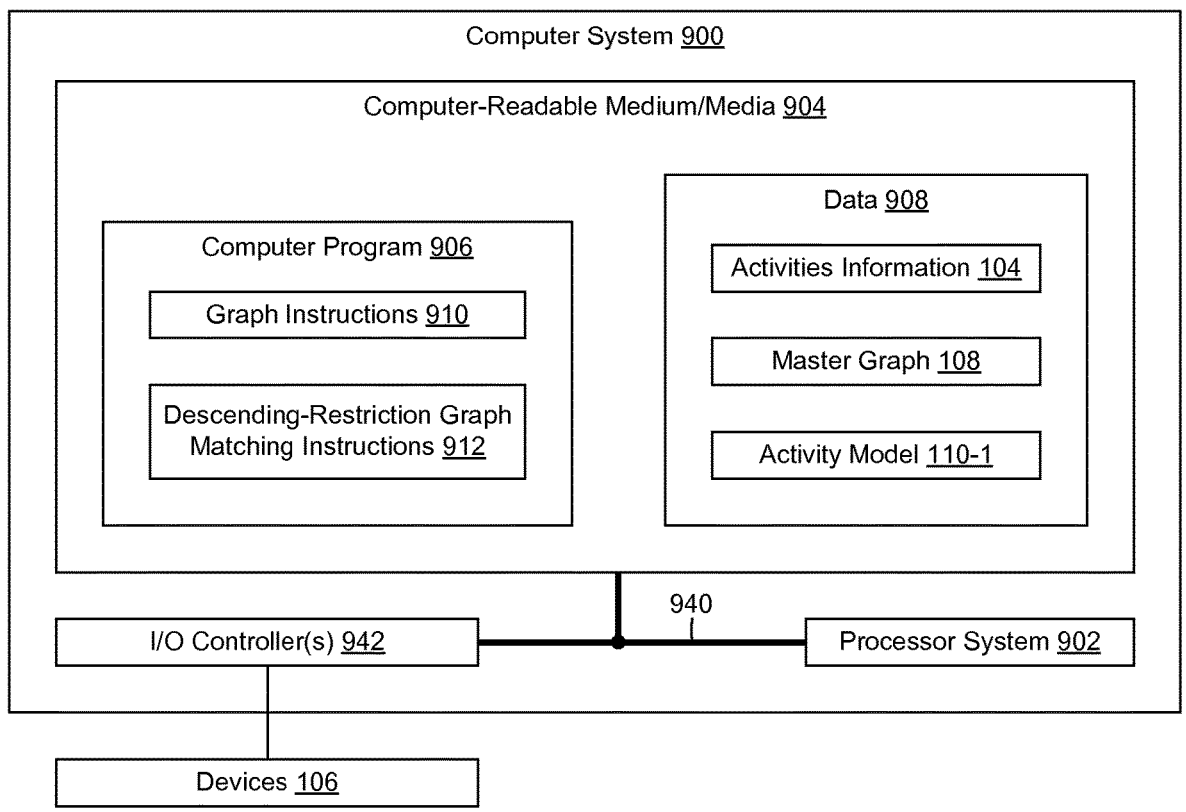
FIG. 9 is a block diagram of a computer system, which may represent an example embodiment of the system of FIG. 1.

FIG. 9 is a block diagram of a computer system 900, configured to construct a master graph 108 based on activities information 104 of multiple devices 106, and to generate an activity suggestion/prediction model 110 for one of the devices based on master graph 108 and the activities information 104 of the respective device. Computer system 900 may represent an example embodiment of system 102 in FIG. 1.

Computer system 900 includes one or more processors, illustrated here as a processor 902, to execute instructions of a computer program 906 encoded within a computer-readable medium 904.

Processor 902 may include one or more instruction processors and/or processor cores, and a control unit to interface between the instruction processor(s)/core(s) and computer readable medium 904. Processor 902 may include, without limitation, a microprocessor, a graphics processor, a physics processor, a digital signal processor, a network processor, a front-end communications processor, a co-processor, a management engine (ME), a controller or microcontroller, a central processing unit (CPU), a general purpose instruction processor, and/or an application-specific processor.

Computer-readable medium 904 may include a transitory or non-transitory computer-readable medium.

Computer-readable medium 904 further includes data 908, which may be used by processor 902 during execution of computer program 906, and/or generated by processor 902 during execution of computer program 906.

In the example of FIG. 9, computer program 906 includes graph instructions 910 to cause processor 902 to construct master graph 108 based on activities information 104, such as described in one or more examples above.

Computer program 906 further includes graph matching instructions, illustrated here as descending-restriction graph matching instructions 912 to cause processor 902 to generate activity model 110-1 for one of the devices based on master graph 108 and activities information 104 of the respective device, such as described in one or more examples above.

Computer system 900 may include communications infrastructure 940 to communicate amongst devices and/or resources of computer system 900.

Computer system 900 may include one or more input/output (I/O) devices and/or controllers 942 to interface with one or more other systems, such as to communicate with devices 106.

Figure 10:
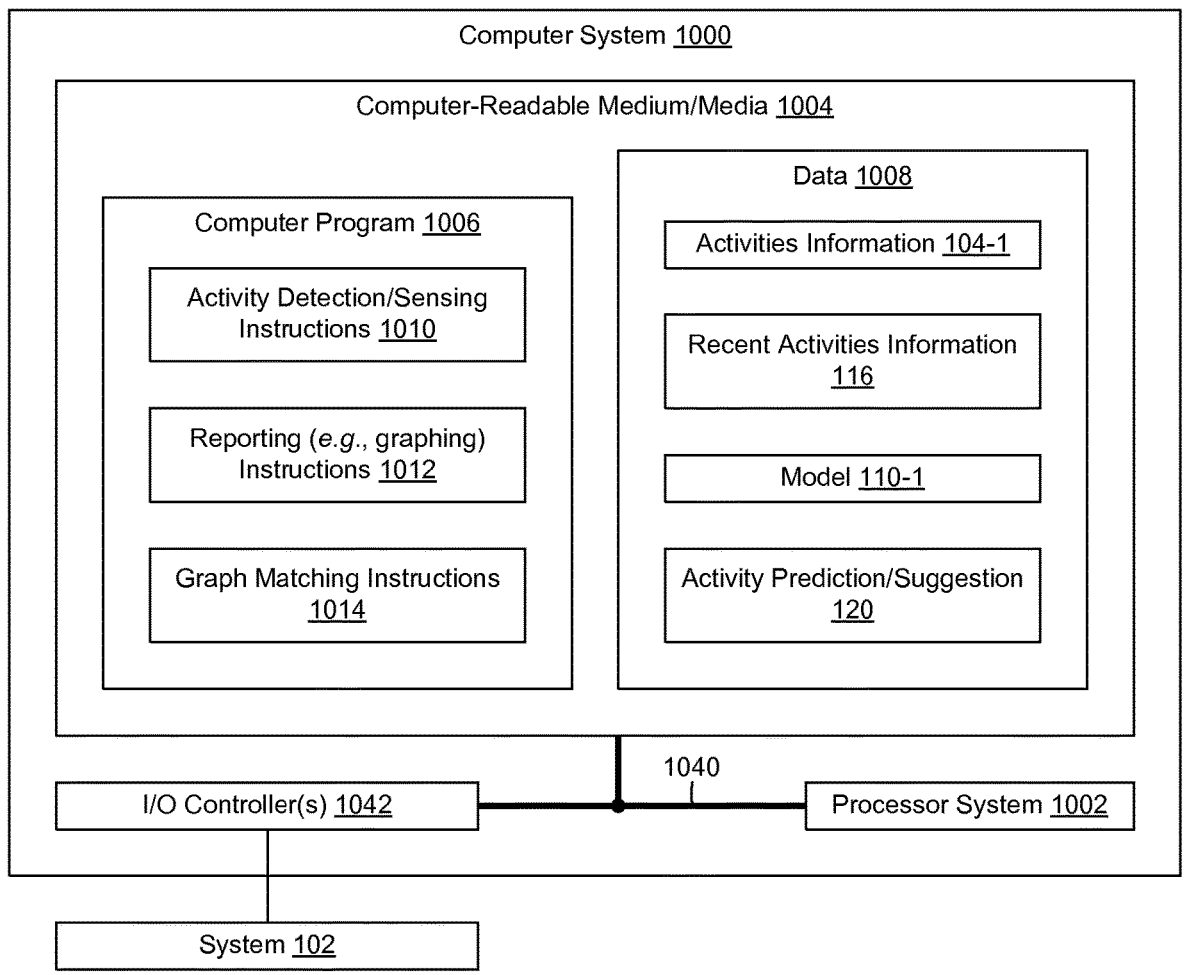
FIG. 10 is a block diagram of a computer system, which may represent an example embodiment of a device of FIG. 1.

FIG. 10 is a block diagram of a computer system 1000, configured to report activities information 104-1 of a device to a system (e.g., system 102 in FIG. 1), receive an activity suggestion/prediction model 110-1 from the system, and generate an activity prediction/suggestion 120 based on recent activities information 116 and model 110-1. Computer system 1000 may represent an example embodiment of device 106-1 in FIG. 1, or a portion thereof.

Computer system 1000 includes one or more processors, illustrated here as a processor 1002, to execute instructions of a computer program 1006 encoded within a computer-readable medium 1004.

Processor 1002 may include one or more instruction processors and/or processor cores, and a control unit to interface between the instruction processor(s)/core(s) and computer readable medium 1004. Processor 1002 may include, without limitation, a microprocessor, a graphics processor, a physics processor, a digital signal processor, a network processor, a front-end communications processor, a co-processor, a management engine (ME), a controller or microcontroller, a central processing unit (CPU), a general purpose instruction processor, and/or an application-specific processor.

Computer-readable medium 1004 may include a transitory or non-transitory computer-readable medium.

Computer-readable medium 1004 further includes data 1008, which may be used by processor 1002 during execution of computer program 1006, and/or generated by processor 1002 during execution of computer program 1006.

In the example of FIG. 10, computer program 1006 includes activity detection/sensing instructions 1010 to cause processor 1002 to monitor, detect, and/or sense activities, such as described in one or more examples above.

Computer program 1006 further includes reporting instructions 1012 to cause processor 1002 to report activities information 104-1 to system 102, and to provide recent activities information 116, such as described in one or more examples above.

Computer program 1006 further includes graph matching instructions 1014 to cause processor 1002 to generate an activity prediction/suggestion 120 based on a model 110-1 from system 120, and recent activities information 116, such as described in one or more examples above.

Computer system 1000 may include communications infrastructure 1040 to communicate amongst devices and/or resources of computer system 1000.

Computer system 1000 may include one or more input/output (I/O) devices and/or controllers 1042 to interface with one or more other systems, such as to communicate with system 102.

Methods and systems disclosed herein may be implemented with respect to one or more of a variety of systems, such as described below with reference to FIG. 11. Methods and systems disclosed herein are not, however, limited to the examples of FIG. 11.

Figure 11:
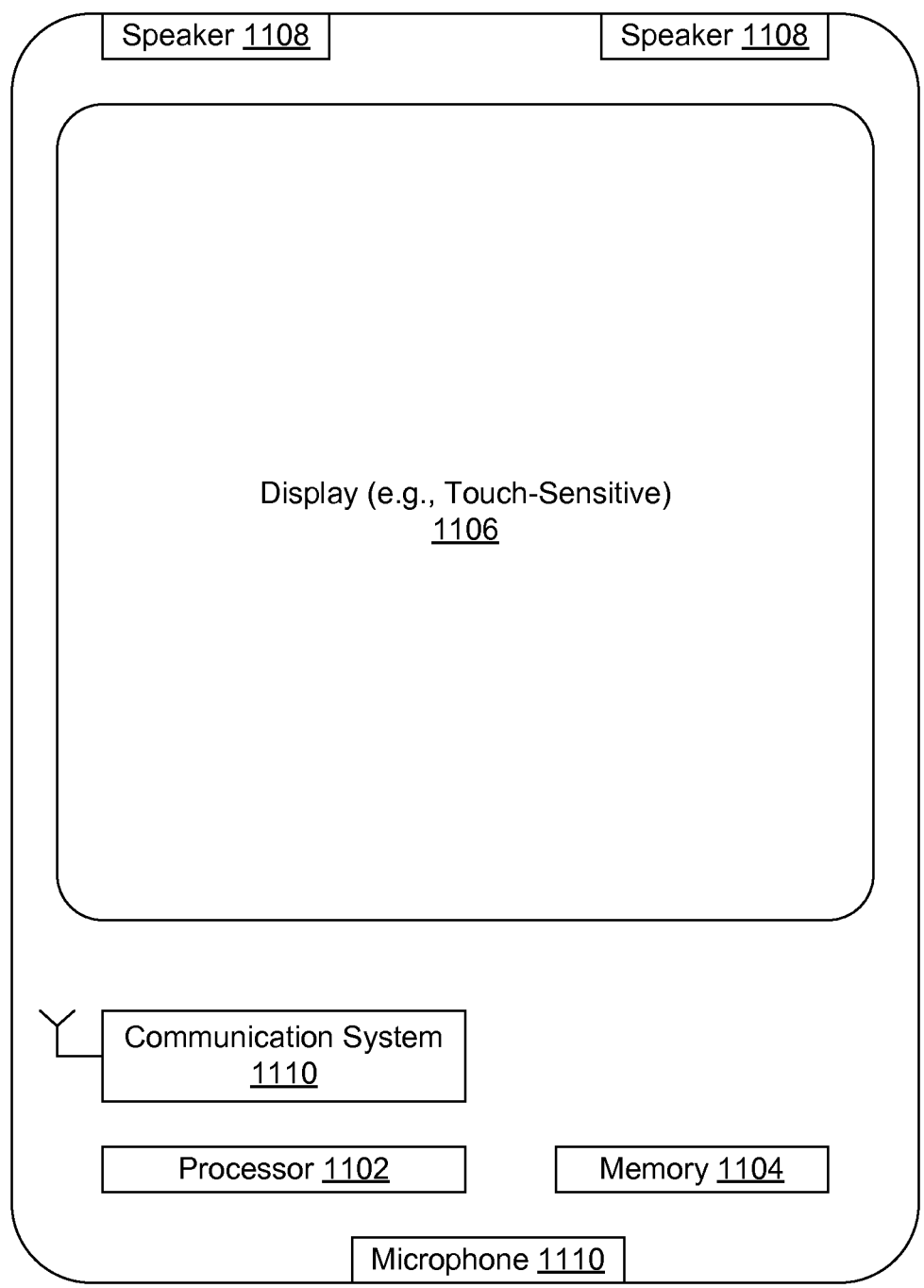
FIG. 11 is a block diagram of a device, which may represent an example embodiment of a device of FIG. 1.

FIG. 11 is a block diagram of a device 1100 that includes a processor 1102 and associated memory, cache, and/or other computer-readable medium, illustrated here as memory 1104. Device 1100 may represent an example embodiment of device 106-1 in FIG. 1, and processor 1102 and memory 1104 may represent an example embodiment of computer system 1000 in FIG. 10.

Device 1100 further includes a user interface, illustrated here as including a display 1106, speakers 1108, and a microphone 1110.

Device 1100 further includes a communication system 1110 to communicate between an external communication network and one or more of processor 1102 and the user interface. The external network may include a voice network (e.g., a wireless telephone network), and/or a data or packet-based network (e.g., a proprietary network and/or the Internet). Communication system 1110 may include a wired and/or wireless communication system. Communication system 1106 may be configured to communicate with system 102 in FIG. 1.

Device 1100 may represent an example embodiment of device 106-1 in FIG. 1. Device 106-1 is not, however, limited to the example of FIG. 11.

In other embodiments, device 1100 may be configured as a stationary or portable/hand-held device, and may be configured as, for example, a mobile telephone, a set-top box, a gaming device, and/or a rack-mountable, desk-top, lap-top, notebook, net-book, note-pad, or tablet system, and/or other conventional and/or future-developed system(s). Device 1100 is not, however, limited to these examples.

The following examples pertain to further embodiments.

An Example 1 is a method that includes representing activities of multiple devices in a master graph, wherein vertices of the master graph represent the activities, and wherein edges of the vertices represent sequences of the activities; searching the master graph at progressively expansive levels of restrictions until a portion of the master graph is identified that matches a sequence of activities of a first one of the devices at the respective level of restriction; and outputting a subgraph of the master graph that includes the identified portion of the master graph as an activity prediction model of the first device.

In an Example 2, the searching includes searching the master graph at the progressively expansive levels of restrictions until a sequence of vertices along a path of sequential vertices of the master graph is identified that matches the sequence of activities of a first one of the devices at the respective level of restriction; and the method further includes selecting the subgraph to include the sequence of vertices and one or more vertices that are adjacent to the sequence of vertices.

In an Example 3, the selecting includes selecting the subgraph to include the sequence of vertices and one or more vertices adjacent to the sequence of vertices.

In an Example 4, the activities of the first device are represented as graph data, vertices of the graph data and vertices of the master graph include multiple properties, and the searching includes performing a first search to identify a sequence of vertices of the master graph for which the vertex properties are identical the vertex properties of a sequence of vertices of the graph data; and performing a second search to identify a sequence of vertices of the of the master graph for which a subset of vertex properties is identical to the subset of vertex properties of the sequence of vertices of the graph data, if no sequence of vertices of the master graph is identified by the first search.

In an Example 5, the devices include user computing devices, the activities of the devices include browser activities. In this example, the representing includes representing a browser activity as a vertex for which a property type is browser and a for which property name includes a uniform resource locator (URL) of the browser activity, generating a first token that includes a domain name of the URL, and generating one or more additional tokens, each including a portion of the URL within a respective pair of back-slashes of the URL.

Further in this example, the performing a first search includes performing the first search to identify a browser type vertex of the master graph for which the property name and tokens are identical to the property name and tokens of a browser type vertex of the graph data; and the performing a second search includes performing the second search to identify a browser type vertex of the master graph for which the property name and a subset of tokens are identical to the property name and a subset of tokens of the browser type vertex of the graph data.

In an Example 6, the devices include user computing devices, the activities of the devices include applications activities. In this example, the representing includes representing an application activity as a vertex for which a property type is application, and for which a property name includes a name of the respective application and a duration of the application activity. Further in this example, the performing a first search includes performing the first search to identify an application type vertex of the master graph for which the application name and duration are identical to the application name and duration of an application type vertex of the graph data; and the performing a second search includes performing the second search to identify an application type vertex of the master graph for which the application name is identical to the application name of an application type vertex of the graph data, and disregarding the duration of the application type vertex of the master graph and the duration of the application type vertex of the graph data. Further in this example, the method further includes scoring a sequence of vertices of the master graph identified in the second search based at least in part on a duration of an application type vertex of the identified sequence of vertices.

In an Example 7, the representing includes representing activities of the multiple devices that occur prior an event in the master graph, and the method further includes searching the model to identify a sequence of vertices along a path of sequential vertices of the model that matches a sequence of activities of the first device that occur subsequent to the event; identifying a vertex adjacent to the sequence of vertices of the model; and outputting an activity associated with the adjacent vertex as one or more of a predicted activity and a suggested activity.

In an Example 8, the method of any one of Examples 1-7 is performed on a server system.

In an Example 9, the method of any one of Examples 1-8 is performed on a multi-cluster distributed processing and storage server system.

In an Example 10, further to any one of Examples 1-9, the representing, the searching, and the outputting are performed on a server system; the representing includes representing activities of the multiple devices that occur prior an event in the master graph; and the outputting includes outputting the activity prediction model to the first device to search the model to identify a sequence of vertices along a path of sequential vertices of the model that matches a sequence of activities of the first device that occur subsequent to the event, identify a vertex adjacent to the sequence of vertices of the model, and output an activity associated with the adjacent vertex as one or more of a predicted activity and a suggested activity of the first device.

In an Example 11, further to Examples 10, the devices include user devices; the activities of the user devices include one or more of browser activities and applications activities; the representing, the searching, and the outputting are performed on a server system; and the outputting further includes outputting the activity prediction model to the first device to output the activity associated with the adjacent vertex as one or more of a suggested browser activity, a suggested application activity, a suggested purchase activity, and a suggested social relationship activity.

An Example 12 is an apparatus configured to perform the method of any one of Examples 1-11.

An Example 13 is an apparatus comprising means for performing the method of any one of Examples 1-11.

An Example 14 is a machine to perform the method of any of one of Examples 1-11.

An Example 15 is a machine readable medium comprising a plurality of instructions that, when executed on a computing device, cause the computing device to carry out a method according to any one of Examples 1-11.

An Example 16 is a communications device arranged to perform the method of any one of Examples 1-11.

An Example 17 is a computer system to perform the method of any of Examples 1-11. An Example 18 is a computing device comprising a chipset according to any one of Examples 1-11.

An Example 19 is a non-transitory computer readable medium encoded with a computer program that includes instructions to cause a processor to perform the method of any one of Examples 1-11.

An Example 20 is a method performed at a device that includes providing activities information regarding activities of the first device that occur prior to an event to a server system configured to represent activities of multiple devices in a master graph and output a subgraph of the master graph as an activity model of the first device; receiving the activity model from the server; searching the activity model to identify a sequence of vertices along a path of sequential vertices of the model that matches a sequence of activities of the first device that occur subsequent to the event; identifying a vertex adjacent to the sequence of vertices of the model; and outputting an activity associated with the adjacent vertex as one or more of a predicted activity and a suggested activity.

In an Example 21, the providing includes providing the activities information regarding activities of the first device to a server system configured to represent the activities of the multiple devices in a master graph in which vertices represent the activities and edges of the vertices represent sequences of the activities, search the master graph at progressively expansive levels of restrictions until a portion of the master graph is identified that matches a sequence of activities of the first device at the respective level of restriction, and output the subgraph to include the identified portion of the master graph as the activity prediction model of the first device.

In an Example 22, the providing includes providing the activities information regarding activities of the first device to a multi-cluster distributed processing and storage server system configured to represent the activities of the multiple devices in a master graph in which vertices represent the activities and edges of the vertices represent sequences of the activities, search the master graph at progressively expansive levels of restrictions until a portion of the master graph is identified that matches a sequence of activities of the first device at the respective level of restriction, and output the subgraph to include the identified portion of the master graph as the activity prediction model of the first device.

In an Example 23, the devices include user devices; the activities of the user devices include one or more of browser activities and applications activities; and the outputting includes outputting the activity associated with the adjacent vertex as one or more of a suggested browser activity, a suggested application activity, a suggested purchase activity, and a suggested social relationship activity.

In an Example 24, the devices include respective radio identifier tag readers to read radio identifier tags associated with respective vendor merchandise; the activities of the devices include activity merchandise activity at stores associated with the respective devices; the outputting includes outputting the activity associated with the adjacent vertex as a suggested merchandise activity of a store associated with the first device; and the merchandise activity includes one or more merchandise locations relative to a store layout, times of residence of the merchandise at the respective locations, sales of the respective merchandise, sales prices of the respective merchandise, and sales promotions of the respective merchandise.

In an Example 25, the devices include respective orientation-controllable imaging devices; the activities of the devices include images of the respective imaging devices; the outputting includes outputting the activity associated with the adjacent vertex as a suggested orientation of an imaging device of the first device.

An Example 26 is an apparatus configured to perform the method of any one of Examples 20-25.

An Example 27 is an apparatus that includes means for performing the method of any one of Examples 20-25.

An Example 28 is a machine to perform the method of any of Examples 20-25.

An Example 29 is machine readable medium comprising a plurality of instructions that, when executed on a computing device, cause the computing device to carry out a method according to any one of Examples 20-25.

An Example 30 is a communications device arranged to perform the method of any one of Examples 20-25.

An Example 31 is a computer system to perform the method of any of Examples 20-25.

An Example 32 is a computing device comprising a chipset according to any one of Examples 20-25.

An Example 33 is a non-transitory computer readable medium encoded with a computer program that includes instructions to cause a processor to perform the method of any one of Examples 20-25.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed. While various embodiments are disclosed herein, it should be understood that they are presented as examples. The scope of the claims should not be limited by any of the example embodiments disclosed herein.

What is claimed is:

1. A method to be performed on a server system, comprising:
    representing, on the server system, activities of multiple devices in a master graph, wherein vertices of the master graph represent the activities, and edges of the vertices represent sequences of the activities, and wherein the representing includes representing activities of the multiple devices that occur prior to an event;
    searching, on the server system, the master graph at progressively expansive levels of restrictions until a portion of the master graph is identified that matches a sequence of activities of a first one of the devices at the respective level of restriction; and
    outputting, from the server system to the first device, a subgraph of the master graph that includes the identified portion of the master graph as an activity prediction model of the first device, wherein the outputting includes outputting the activity prediction model to the first device to search the model to identify a sequence of vertices along a path of sequential vertices of the model that matches a sequence of activities of the first device that occur subsequent to the event, identify a vertex adjacent to the sequence of vertices of the model, and output an activity associated with the adjacent vertex as one or more of a predicted activity and a suggested activity of the first device.

2. The method of claim 1, wherein:
    the searching includes searching the master graph at the progressively expansive levels of restrictions until a sequence of vertices along a path of sequential vertices of the master graph is identified that matches the sequence of activities of a first one of the devices at the respective level of restriction; and
    the method further includes selecting, on the server, the subgraph to include the sequence of vertices and one or more vertices that are adjacent to the sequence of vertices.

3. The method of claim 2, wherein the selecting includes:
    selecting the subgraph to include the sequence of vertices and one or more vertices adjacent to the sequence of vertices.

4. The method of claim 1, wherein the activities of the first device are represented as graph data, wherein vertices of the graph data and vertices of the master graph include multiple properties, and wherein the searching includes:
  performing a first search to identify a sequence of vertices of the master graph for which the vertex properties are identical to the vertex properties of a sequence of vertices of the graph data; and
  performing a second search to identify a sequence of vertices of the master graph for which a subset of vertex properties is identical to the subset of vertex properties of the sequence of vertices of the graph data, if no sequence of vertices of the master graph is identified by the first search.

5. The method of claim 4, wherein the devices include user computing devices, wherein the activities of the devices include browser activities, and wherein:
  the representing includes representing a browser activity as a vertex for which a property type is browser and for which a property name includes a uniform resource locator (URL) of the browser activity, generating a first token that includes a domain name of the URL, and generating one or more additional tokens, each including a portion of the URL within a respective pair of back-slashes of the URL;
  the performing a first search includes performing the first search to identify a browser type vertex of the master graph for which the property name and tokens are identical to the property name and tokens of a browser type vertex of the graph data; and
  the performing a second search includes performing the second search to identify a browser type vertex of the master graph for which the property name and a subset of tokens are identical to the property name and a subset of tokens of the browser type vertex of the graph data.

6. The method of claim 4, wherein the devices include user computing devices, wherein the activities of the devices include applications activities, and wherein:
  the representing includes representing an application activity as a vertex for which a property type is application, and for which a property name includes a name of the respective application and a duration of the application activity;
  the performing a first search includes performing the first search to identify an application type vertex of the master graph for which the application name and duration are identical to the application name and duration of an application type vertex of the graph data;
  the performing a second search includes performing the second search to identify an application type vertex of the master graph for which the application name is identical to the application name of an application type vertex of the graph data, and disregarding the duration of the application type vertex of the master graph and the duration of the application type vertex of the graph data; and
  the method further includes scoring, on the server, a sequence of vertices of the master graph identified in the second search based at least in part on a duration of an application type vertex of the identified sequence of vertices.

7. The method of claim 1, wherein the server system is a multi-cluster distributed processing and storage server system.

8. The method of claim 1, wherein:
  the devices include user devices;
  the activities of the user devices include one or more of browser activities and applications activities; and
  the outputting further includes outputting the activity prediction model to the first device to output the activity associated with the adjacent vertex as one or more of a suggested browser activity, a suggested application activity, a suggested purchase activity, and a suggested social relationship activity.

9. A server, comprising, a processor and memory to:
represent, on the server, activities of multiple devices in a master graph, wherein vertices of the master graph represent the activities, and edges of the vertices represent sequences of the activities, and wherein to represent includes to represent activities of the multiple devices that occur prior to an event;
search, on the server, the master graph at progressively expansive levels of restrictions until a portion of the master graph is identified that matches a sequence of activities of a first one of the devices at the respective level of restriction;
output, from the server to the first device, a subgraph of the master graph that includes the identified portion of the master graph as an activity prediction model of the first device;
wherein to output includes to output the activity prediction model to the first device to search the model to identify a sequence of vertices along a path of sequential vertices of the model that matches a sequence of activities of the first device that occur subsequent to the event, identify a vertex adjacent to the sequence of vertices of the model, and output an activity associated with the adjacent vertex as one or more of a predicted activity and a suggested activity of the first device.

10. The server of claim 9, wherein the processor and memory are to further:
  search, on the server, the master graph at the progressively expansive levels of restrictions until a sequence of vertices along a path of sequential vertices of the master graph is identified that matches the sequence of activities of a first one of the devices at the respective level of restriction; and
  select, on the server, the subgraph to include the sequence of vertices and one or more vertices that are adjacent to the sequence of vertices.

11. The server of claim 10, wherein the processor and memory are to further:
  select, on the server, the subgraph to include the sequence of vertices and one or more vertices adjacent to the sequence of vertices.

12. The server of claim 9, wherein the activities of the first device are represented as graph data, wherein vertices of the graph data and vertices of the master graph include multiple properties, and wherein the processor and memory are to further:
  perform, on the server, a first search to identify a sequence of vertices of the master graph for which the vertex properties are identical to the vertex properties of a sequence of vertices of the graph data; and
  perform, on the server, a second search to identify a sequence of vertices of the master graph for which a subset of vertex properties is identical to the subset of vertex properties of the sequence of vertices of the graph data, if no sequence of vertices of the master graph is identified by the first search.

13. The server of claim 12, wherein the devices include user computing devices, wherein the activities of the devices include browser activities, and wherein the processor and memory are to further:
represent, on the server, a browser activity as a vertex for which a property type is browser and for which a property name includes a uniform resource locator (URL) of the browser activity, generate a first token that includes a domain name of the URL, and generate one or more additional tokens, each including a portion of the URL within a respective pair of back-slashes of the URL;
perform, on the server, the first search to identify a browser type vertex of the master graph for which the property name and tokens are identical to the property name and tokens of a browser type vertex of the graph data; and
perform, on the server, the second search to identify a browser type vertex of the master graph for which the property name and a subset of tokens are identical to the property name and a subset of tokens of the browser type vertex of the graph data.

14. The server of claim 12, wherein the devices include user computing devices, wherein the activities of the devices include applications activities, and wherein the processor and memory are to further:
represent, on the server, an application activity as a vertex for which a property type is application, and for which a property name includes a name of the respective application and a duration of the application activity;
perform, on the server, the first search to identify an application type vertex of the master graph for which the application name and duration are identical to the application name and duration of an application type vertex of the graph data;
perform, on the server, the second search to identify an application type vertex of the master graph for which the application name is identical to the application name of an application type vertex of the graph data, and to disregard the duration of the application type vertex of the master graph and the duration of the application type vertex of the graph data; and
score, on the server, a sequence of vertices of the master graph identified in the second search based at least in part on a duration of an application type vertex of the identified sequence of vertices.

15. A non-transitory computer readable medium encoded with a computer program that includes instructions to cause a server, in response to execution of the instructions by a processor of the server, to:
represent, on the server, activities of multiple devices in a master graph, wherein vertices of the master graph represent the activities, and edges of the vertices represent sequences of the activities, and wherein to represent includes to represent activities of the multiple devices that occur prior to an event;
search, on the server, the master graph at progressively expansive levels of restrictions until a portion of the master graph is identified that matches a sequence of activities of a first one of the devices at the respective level of restriction;
output, from the server to the first device, a subgraph of the master graph that includes the identified portion of the master graph as an activity prediction model of the first device;
wherein to output includes to output the activity prediction model to the first device to search the model to identify a sequence of vertices along a path of sequential vertices of the model that matches a sequence of activities of the first device that occur subsequent to the event, identify a vertex adjacent to the sequence of vertices of the model, and output an activity associated with the adjacent vertex as one or more of a predicted activity and a suggested activity of the first device.

16. The non-transitory computer readable medium of claim 15, further including instructions to cause the server to:
search, on the server, the master graph at the progressively expansive levels of restrictions until a sequence of vertices along a path of sequential vertices of the master graph is identified that matches the sequence of activities of a first one of the devices at the respective level of restriction; and
select, on the server, the subgraph to include the sequence of vertices and one or more vertices that are adjacent to the sequence of vertices.

17. The non-transitory computer readable medium of claim 16, further including instructions to cause the server to:
select, on the server, the subgraph to include the sequence of vertices and one or more vertices adjacent to the sequence of vertices.

18. The non-transitory computer readable medium claim 15, wherein the activities of the first device are represented as graph data, and wherein vertices of the graph data and vertices of the master graph include multiple properties, further including instructions to cause the server to:
perform, on the server, a first search to identify a sequence of vertices of the master graph for which the vertex properties are identical to the vertex properties of a sequence of vertices of the graph data; and
perform, on the server, a second search to identify a sequence of vertices of the master graph for which a subset of vertex properties is identical to the subset of vertex properties of the sequence of vertices of the graph data, if no sequence of vertices of the master graph is identified by the first search.

19. The non-transitory computer readable medium of claim 18, wherein the devices include user computing devices, and wherein the activities of the devices include browser activities, further including instructions to cause the server to:
represent, on the server, a browser activity as a vertex for which a property type is browser and for which a property name includes a uniform resource locator (URL) of the browser activity, generate a first token that includes a domain name of the URL, and generate one or more additional tokens, each including a portion of the URL within a respective pair of back-slashes of the URL;
perform, on the server, the first search to identify a browser type vertex of the master graph for which the property name and tokens are identical to the property name and tokens of a browser type vertex of the graph data; and
perform, on the server, the second search to identify a browser type vertex of the master graph for which the property name and a subset of tokens are identical to the property name and a subset of tokens of the browser type vertex of the graph data.

20. The non-transitory computer readable medium of claim 18, wherein the devices include user computing devices, and wherein the activities of the devices include applications activities, further including instructions to cause the server to:
- represent, on the server, an application activity as a vertex for which a property type is application, and for which a property name includes a name of the respective application and a duration of the application activity;
- perform, on the server, the first search to identify an application type vertex of the master graph for which the application name and duration are identical to the application name and duration of an application type vertex of the graph data;
- perform, on the server, the second search to identify an application type vertex of the master graph for which the application name is identical to the application name of an application type vertex of the graph data, and to disregard the duration of the application type vertex of the master graph and the duration of the application type vertex of the graph data; and
- score, on the server, a sequence of vertices of the master graph identified in the second search based at least in part on a duration of an application type vertex of the identified sequence of vertices.

\* \* \* \* \*

UNITED STATES PATENT AND TRADEMARK OFFICE
CERTIFICATE OF CORRECTION

PATENT NO. : 10,997,245 B2  
APPLICATION NO. : 15/754947  
DATED : May 4, 2021  
INVENTOR(S) : Bhaskar Gowda et al.

Page 1 of 1

It is certified that error appears in the above-identified patent and that said Letters Patent is hereby corrected as shown below:

In the Claims

Column 18 Line 27, Claim 18, "...medium claim..." should read – "...medium of claim..."

Signed and Sealed this  
Sixth Day of July, 2021

Drew Hirshfeld  
*Performing the Functions and Duties of the*  
*Under Secretary of Commerce for Intellectual Property and*  
*Director of the United States Patent and Trademark Office*